United States Patent
Baik et al.

(10) Patent No.: US 8,005,458 B2
(45) Date of Patent: Aug. 23, 2011

(54) DEVICE AND METHOD FOR DETECTING AND PREVENTING SENSITIVE INFORMATION LEAKAGE FROM PORTABLE TERMINAL

(75) Inventors: Kwangho Baik, Daejeon (KR); Dongho Kang, Daejeon (KR); Kiyoung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 410 days.

(21) Appl. No.: 12/251,562

(22) Filed: Oct. 15, 2008

(65) Prior Publication Data

US 2009/0163174 A1 Jun. 25, 2009

(30) Foreign Application Priority Data

Dec. 24, 2007 (KR) .................. 10-2007-0136201

(51) Int. Cl.
*H04M 1/66* (2006.01)
*G06F 7/04* (2006.01)
*G08B 1/08* (2006.01)

(52) U.S. Cl. ............... 455/410; 455/411; 455/412.1; 455/412.2; 726/27; 340/539.11; 713/161; 380/247

(58) Field of Classification Search ............ 455/410, 455/411, 412.1, 412.2; 726/18, 21, 23, 27, 726/28, 29, 30; 340/539.11; 713/161, 165, 713/166, 170; 380/247
See application file for complete search history.

(56) References Cited

U.S. PATENT DOCUMENTS

| | | | |
|---|---|---|---|
| 7,123,719 B2 * | 10/2006 | Sowa et al. | 380/247 |
| 7,123,900 B2 * | 10/2006 | Brown et al. | 455/410 |
| 7,143,441 B2 * | 11/2006 | Rygaard | 726/22 |
| 7,222,361 B2 * | 5/2007 | Kemper | 726/4 |
| 7,571,317 B1 * | 8/2009 | Vilhuber | 713/161 |
| 7,787,863 B2 * | 8/2010 | van de Groenendaal | 455/411 |
| 7,822,406 B2 * | 10/2010 | Lee et al. | 455/411 |
| 7,853,250 B2 * | 12/2010 | Harvey et al. | 455/421 |
| 7,889,866 B2 * | 2/2011 | Masugi et al. | 380/252 |
| 2006/0070113 A1 * | 3/2006 | Bhagwat et al. | 726/2 |
| 2006/0293029 A1 * | 12/2006 | Jha et al. | 455/411 |

FOREIGN PATENT DOCUMENTS

KR 1020060067179 A 6/2006

OTHER PUBLICATIONS

Kwang-Ho Baik, et al; "A Method for Preventing Sensitive Data Leakage in Mobile Embedded Devices", An International Journal of Research an Innovation, Special Issue on ICCIT2007, vol. 2, Nov. 2007, pp. 19-22.

* cited by examiner

*Primary Examiner* — Kamran Afshar
*Assistant Examiner* — Gerald Oliver
(74) *Attorney, Agent, or Firm* — Ladas & Parry LLP

(57) ABSTRACT

A device and method for detecting and preventing sensitive information leakage from a portable terminal is provided. A device for detecting and preventing leakage of sensitive information from a portable terminal includes a data storage unit that stores data containing sensitive information, an external interface that interfaces the portable terminal with the external, a sensitive information manager that detects and prevents leakage of the sensitive information stored in the data storage unit through the external interface, and a sensitive information leakage detecting and preventing unit that is disposed between the data storage unit and the external interface to detect and prevent the leakage of the sensitive information.

10 Claims, 3 Drawing Sheets

DEVICE AND METHOD FOR DETECTING AND PREVENTING SENSITIVE INFORMATION LEAKAGE FROM PORTABLE TERMINAL

RELATED APPLICATIONS

The present application claims priority to Korean Patent Application Serial Number 10-2007-0136201, filed on Dec. 24, 2007, the entirety of which is hereby incorporated by reference.

BACKGROUND OF THE INVENTION

1. Field of the Invention

The present invention relates to a device and method for detecting and preventing sensitive information leakage from a portable terminal, and in particular, to a device and method for detecting and preventing sensitive information leakage using a sensitive information manager and a sensitive information leak detecting and preventing unit.

This work was supported by the IT R&D program of MIC/IITA [2007-S-023-01, Development of The Threat Containment for All-In-One Mobile Devices on Convergence Networks].

2. Description of the Related Art

Portable terminals can access networks wired or wireless, while having computing capacity utilized for various applications, including the ability of being portable. Examples of portable terminals include mobile phones, portable computers, multimedia devices, etc. Portable terminals are improving in functions and capabilities and are spreading due to the network infrastructure and development of semiconductor chip techniques. Meanwhile, the applications of portable terminals are increasing in both quality and quantity in accordance with the improvement of functions and capabilities of portable terminals.

With the development of various radio communication techniques, such as WLAN, WiBro, third-generation mobile communication, Bluetooth, and Wi-Fi, and the distribution of the infrastructure, services usable through portable terminals are being diversified. The capabilities of portable terminals are also undergoing many changes. For example, computing capability and data storage capability continue developing, including the development of the network interface using radio communication. This is because of the development of portable terminals, in which users can easily perform business transactions through portable terminals. Therefore, portable terminals are expected to be developed and innovated in the near future.

With the expansion of applications and the increase in capabilities of portable terminals, in general, sensitive information used by users is stored in portable terminals. However, this sensitive information should not be able to be leaked to other persons. Sensitive information means information which can potentially harm users if the information is accidentally or illegally leaked out of the portable terminals, and examples of the sensitive information include private information, address books, schedule, secret documents, etc. Further, information that is considered important information by the user, which needs to be protected, can be referred to as sensitive information. Therefore, sensitive information can be defined as a top priority portion of information stored in portable terminals that should be protected.

As the application fields of portable terminals are diversified and the number of users is increased, portable terminal security issues come into the spotlight. Especially, the issue of protecting sensitive information stored in portable terminals is very important. The reason is that sensitive information leakage could potentially harm the users, which could delay the development of portable terminals.

Three types of security techniques regarding information leakage exist. One type of security is authentication, which restricts access to information the user desires to protect. Authentication only allows those who are authorized to access corresponding information, thereby capable of preventing illegal access. Another type of security is encryption. Encryption makes information readable to only those who possess an encryption key, and is thus useful for protecting information. The last type of security is intrusion detection. Intrusion detection is utilized to detect not only intrusion for information leakage but also intrusion for other purposes. Intrusion detection helps prevent information leakage. These techniques have been developed in existing computing and networking environments, but not perfect. That is, hackers have evolved and any problems with the security techniques have been revealed.

In the case of mobile phones, which one of the portable terminals, many security warnings have been being reported. As mobile phones progress and the amount of sensitive information stored in mobile phones and the exchange between the mobile phones increases, research on security warnings is necessary. Currently, however, research for security of mobile phones is at an early stage, and specifically, research regarding information leakage has just begun.

SUMMARY OF THE INVENTION

Accordingly, it is an object of the present invention to provide a device and method for detecting and preventing sensitive information leakage from a portable terminal.

According to an aspect of the present invention, there is provided a device for detecting and preventing leakage of sensitive information from a portable terminal. The device includes: a data storage unit that stores data containing sensitive information; an external interface that interfaces the portable terminal with the external; a sensitive information manager that detects and prevents leakage of the sensitive information stored in the data storage unit through the external interface; and a sensitive information leakage detecting and preventing unit that is disposed between the data storage unit and the external interface to detect and prevent leakage of the sensitive information. The sensitive information manager extracts characteristics from the sensitive information and attaches a flag to the sensitive information.

The sensitive information manager may transmit the extracted characteristics and the attached flag to the sensitive information leakage detecting and preventing unit.

The sensitive information leakage detecting and preventing unit may include a characteristic detector that determines information having the characteristics transmitted from the sensitive information manager as the sensitive information.

The sensitive information leakage detecting and preventing unit may include a flag detector that determines information containing the flag transmitted from the sensitive information manager as the sensitive information.

The sensitive information manager may extract a plurality of characteristics from a sensitive information item.

The attachment of the flag may not influence the content of the sensitive information.

The sensitive information leakage detecting and preventing unit may include a Heuristic detector using Heuristic analysis.

The Heuristic detector may learn, in advance, a period that the user uses information, determine use of the information that does not coincide with the period as abnormal use, and prevent the information from leaking.

According to another aspect of the invention, there is provided a method of detecting and preventing leakage of sensitive information from a portable terminal. The method includes: allowing a sensitive information manager to determine whether new sensitive information exists; if it is determined that new sensitive information exists, allowing the sensitive information manager to extract characteristics from the sensitive information and to attach a flag to the sensitive information; and allowing the sensitive information manager to transmit the extracted characteristics and the attached flag to a sensitive information leakage detecting and preventing unit.

The method may further include allowing the sensitive information leakage detecting and preventing unit to determine information having the characteristics transmitted from the sensitive information manager as the sensitive information.

The method may further include allowing the sensitive information leakage detecting and preventing unit to determine information containing the flag transmitted from the sensitive information manager as the sensitive information.

The method may further include allowing the sensitive information leakage detecting and preventing unit to detect sensitive information using Heuristic analysis.

In the detecting of the sensitive information using Heuristic analysis, a period that the user utilizes information may be learned in advance, use of the information which does not coincide with the period may be determined as abnormal use, and leakage of the information may be prevented.

According to the above-described aspects of the present invention, it is possible to detect and prevent leakage of insensitive information stored in portable terminals and to detect and prevent the leakage of sensitive information due to sensitive information leakage attempts of ill-intended attackers and carelessness of portable terminal users.

Therefore, it is possible to improve security and stability of portable terminals such as mobile communication terminals and to diversify applications of portable terminals having sensitive information which needs to be protected. Further, if implementing the present invention in hardware, it is possible to prevent sensitive information even while software security is weak.

DESCRIPTION OF THE PREFERRED EMBODIMENTS

Embodiments of the present invention now will be described more fully hereinafter with reference to the accompanying drawings, in which embodiments of the invention are shown. The invention may, however, be embodied in many different forms and should not be construed as limited to the embodiments set forth herein.

Figure 1:
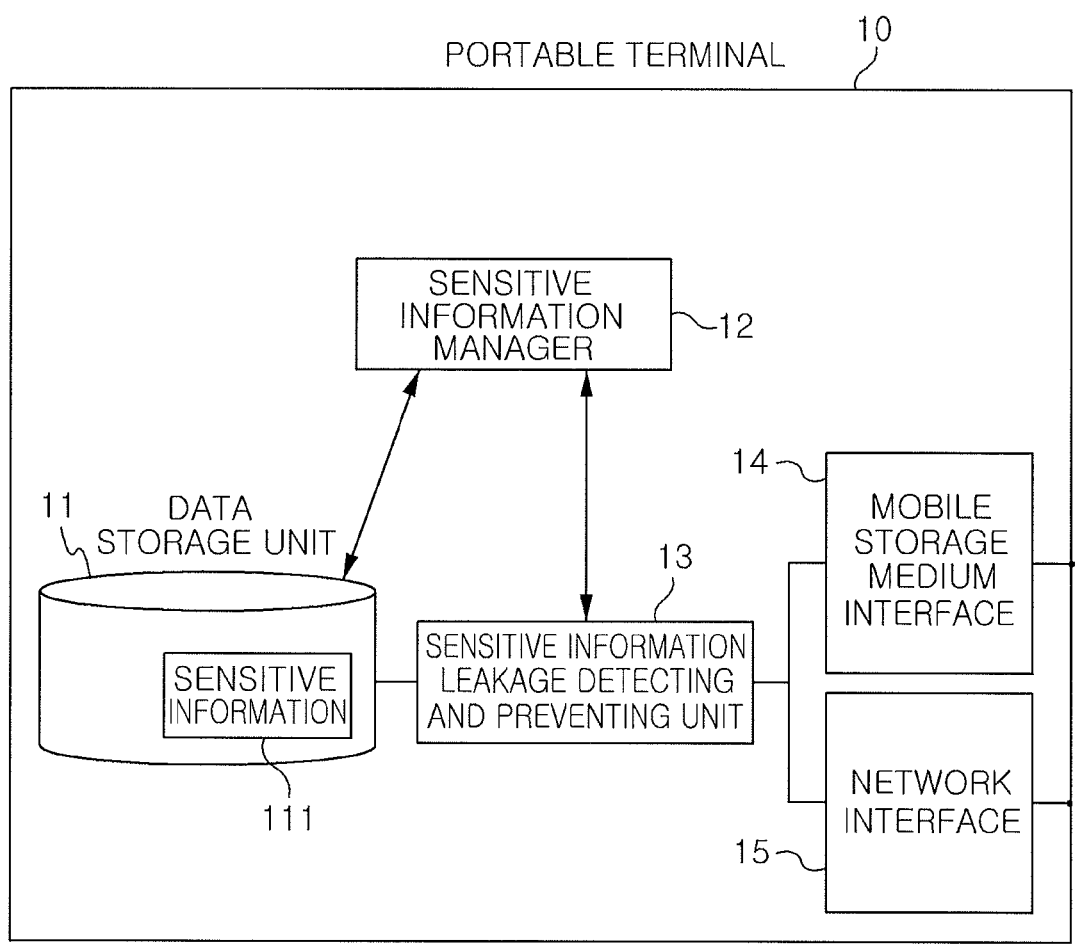
FIG. 1 is a schematic block diagram illustrating the configuration of a portable terminal according to an embodiment of the present invention.

FIG. 1 is a schematic block diagram illustrating the configuration of a portable terminal 10 according to an embodiment of the present invention. For purposes of clarity, only components required to explain the present invention are shown in FIG. 1. However, the portable terminal 10 has other components in addition to components shown in FIG. 1.

The portable terminal 10 includes a data storage unit 11, a sensitive information manager 12, a sensitive information leakage detecting and preventing unit 13, a mobile storage medium interface 14, and a network interface 15. The data storage unit 11 stores user data including sensitive information 111 and basic data for operation of the portable terminal. An object of the present invention is to detect and prevent the leakage of the sensitive information 111 from the portable terminal. The sensitive information 111 may be classified into user-defined sensitive information, which is defined on the basis of the user's purposes, and automatically generated sensitive information that is defined by the sensitive information manager 12 for leakage prevention.

The sensitive information manager 12 performs control for detecting and protecting the leakage of the sensitive information 111 stored in the data storage unit 11. The sensitive information manager 12 extracts characteristics from the sensitive information 111 and attaches a flag to the sensitive information 111. The sensitive information manager 12 transmits the extracted characteristics and the attached flag to the sensitive information leakage detecting and preventing unit 13 to assist in detecting and preventing the leakage of the sensitive information 111 on the basis of the transmitted characteristics and flag. The sensitive information leakage detecting and preventing unit 13 is disposed between the data storage unit 11 and either the mobile storage medium interface 14 or the network interface 15, and detects and prevents the leakage of the sensitive information 111. The mobile storage medium interface 14 and the network interface 15 are referred to as external interfaces.

In the embodiment of the present invention, in order to detect the leakage of sensitive information, at least one of the three following methods is used.

The first method utilizes the characteristics of the sensitive information 111 extracted by the sensitive information manager 12. The sensitive information manager 12 extracts the characteristics from the user-defined sensitive information, which is defined on the basis of the user's purposes, or the automatically generated sensitive information that is defined by the sensitive information manager 12 for leakage prevention. Examples of the characteristics include specific words (for example, secret or security) contained in a file name, private data such as user's name, social security number, or address contained in the content of a file, data stored in a specific folder, or a specific extension. The sensitive information manager 12 extracts the characteristics and transmits them to the sensitive information leakage detecting and preventing unit 13. Then, the sensitive information leakage detecting and preventing unit 13 starts to monitor data transmitted from the data storage unit 11 to an external interface, such as the mobile storage medium interface 14 or the network interface 15. The sensitive information leakage detecting and preventing unit 13 detects data having the transmitted characteristics as sensitive information and prevents the transmission of sensitive information. Preventing the transmission of sensitive information may be performed automatically or with the user's permission. If a plurality of characteristics are extracted from one logical sensitive information item and are used to determine whether an transmitted information is sensitive information, it is possible to improve accuracy of determination.

The second method utilizes a flag attached by the sensitive information manager 12. The sensitive information manager 12 attaches, to the sensitive information, a flag which indicates sensitive information, and transmits the flag to the sensitive information leakage detecting and preventing unit 13. Then, the sensitive information leakage detecting and preventing unit 13 starts to monitor data transmitted from the data storage unit 11 to an external interface. The sensitive information leakage detecting and preventing unit 13 detects data containing the transmitted flag as sensitive information and prevents the transmission of sensitive information.

The flag is a kind of sign attached to sensitive information in advance in order to detect the leakage of sensitive information. The flag may be classified into a flag having no influence on the content of the sensitive information and a flag that requires modifying of the content of the sensitive information.

An example of the flag having no influence on the content of the sensitive information is, if a file has a header, the flag inserted into an available user assignment field of the header. When the flag is attached to the file, it is possible to determine whether the file is sensitive information on the basis of the attached flag, the content of header portions before and after the flag, and an offset value in the header. In general, the flag is attached to an available field of a file or a field without influencing the execution of the file even though it may be changed.

An example of the flag that requires modifying of the content of sensitive information is similar to watermark. The flag is attached to the content of sensitive information and the flag is searched to detect the leakage of sensitive information. In the case of legal sensitive information which should be transmitted to the external interface although a flag is attached thereto, it is required to remove the attached flag so that another system can process the sensitive information. The flag removal may be performed by the portable terminal 10 or may be performed by another system which will receive the sensitive information according to predetermined rules. Meanwhile, in the case of an image or sound, a flag that human beings cannot perceive with eyes or ears may be attached. In this case, it is not necessary to remove the flag.

The method of attaching a flag without influencing the content of sensitive information requires a small amount of resource for detection. However, the method of the attachment of the flag should follow the kind of file. Further, the amount of time and resource required to detect sensitive information generally takes more time than the amount of time and resource required to attach the flag. For this reason, the method of attaching a flag without influencing the content of sensitive information may be more economical than the method of changing the content of sensitive information and attaching a flag. According to the kind of file, it may be difficult to use the method of attaching a flag without influencing the content of sensitive information. Therefore, it is preferable to appropriately select any one of the two methods for use.

The third method is to use Heuristic analysis. Heuristic analysis is used when analytic approach to a problem is impossible due to insufficient information. According to Heuristic analysis, an assumption mechanism is made using data within an acquirable range and communicated to a computer, and then update is performed with the new information through a process of trial and error, thereby obtaining a solution closest to the best possible answer. Non-periodicity of access or transmission to a specific memory area, abnormal operation of a processor for data transmission, and so on are recognized and applied to detect the leakage of sensitive information. Heuristic analysis can be applied according to the configuration of a portable terminal or the user's habit.

For example, a period, in which the user uses the sensitive information 111, is learned in advance, and the use of the sensitive information that is not coincidental with the period is determined as leakage of sensitive information. If access to sensitive information (or data) A is concentrated between 9 a.m. to 2 p.m. per day and limited between Monday to Friday per week, and the sensitive information A is accessed around 10 p.m. on Sunday, this access is determined as an abnormal access, which is determined as the leakage of the sensitive information A. Such determination can also be applied to an access pattern. When actions a and b are always performed before and after an access to the sensitive information A, if an access to the sensitive information A occurs without the actions a and b, this access may be determined as the leakage of sensitive information. Examples of such actions can include various actions such as accesses to information, accesses to resources, and system calls.

This determining method can be used not only for detecting leakage of sensitive information but also for automatically designating sensitive information. For example, if there is information which has never been transmitted through an external interface and is used in a specific application program B, the information may be registered as sensitive information. If this sensitive information is transmitted through an external interface, this transmission may be determined as leakage of sensitive information. Also, if an application program other than the application program B transmits the sensitive information through an external interface, this transmission may be determined as leakage of sensitive information. If learning about the normal usage of information is carried out in advance, maximum efficiency is exhibited.

Figure 2:
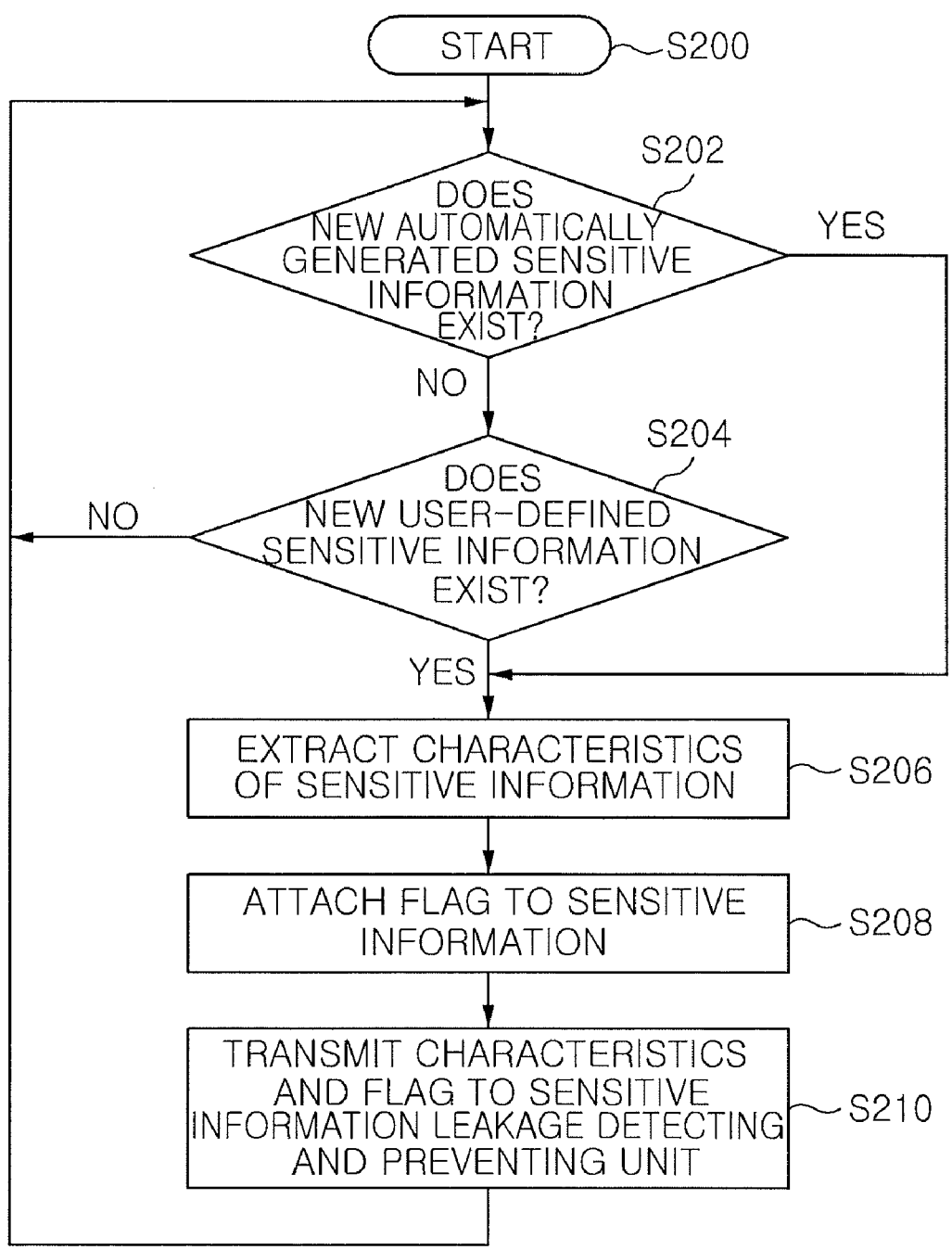
FIG. 2 is a flowchart illustrating a process performed by a sensitive information manager in order to prevent sensitive information from leaking.

FIG. 2 is a flowchart illustrating the process of the sensitive information manager 12 preventing sensitive information from leaking.

If the process starts in Step S200, it is determined in Step S202 whether new automatically generated sensitive information exists. The automatically generated sensitive information is automatically defined as sensitive information by the sensitive information manager 12 in order to prevent sensitive information from leaking. Further, even though it is not recognized by the user, the value of the automatically generated sensitive information is designated as sensitive information when the use forms of the information, the characteristics of the information, applications using the information, etc. are considered. For example, Heuristic analysis described above can be used for designating sensitive information. Even though the user does not perform specific designation, sensitive information may be automatically designated in the portable terminal, thereby protecting sensitive information in the terminal. If it is determined in Step S202 that new automatically generated sensitive information exists, the process proceeds to Step S206. If it is determined in Step S202 that new automatically generated sensitive information does not exist, the process proceeds to Step S204.

In Step S204, it is determined that new user-defined sensitive information exists. User-defined sensitive information is sensitive information defined on the basis of the user's purposes. If it is determined that new user-defined sensitive information does not exist, the process returns to Step S202. If it is determined that new user-defined sensitive information exists, the process proceeds to Step S206.

In Step S206, characteristics of new sensitive information are extracted. The characteristics of the extracted sensitive information are used to determine whether information transmitted through an external interface is sensitive information, or they may be used to define automatically generated sensitive information. Next, in Step S208, a sensitive information flag is attached to the new sensitive information, which makes it possible to determine whether information transmitted through an external interface is sensitive information.

Sequentially, in Step S210, the extracted characteristics and the attached flag are transmitted to the sensitive information leakage detecting and preventing unit 13 to assist in detecting and preventing the leakage of sensitive information.

Figure 3:
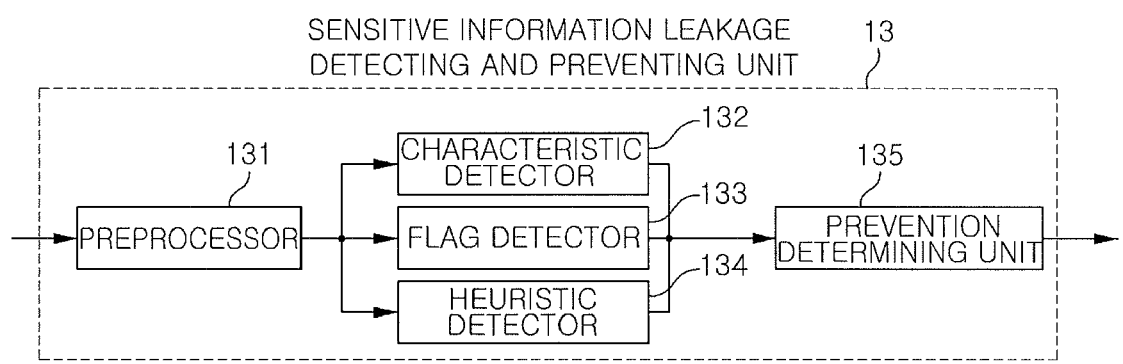
FIG. 3 is a diagram illustrating a detecting and preventing method performed by a sensitive information leakage detecting and preventing unit.

FIG. 3 is a diagram illustrating a detecting and preventing method performed by the sensitive information leakage detecting and preventing unit 13. The sensitive information leakage detecting and preventing unit 13 receives and stores the characteristics of the sensitive information and the flag attached to the sensitive information from the sensitive information manager 12. The sensitive information leakage detecting and preventing unit 13 includes a preprocessor 131, a characteristic detector 132, a flag detector 133, a Heuristic detector 134, and a prevention determining unit 135.

The preprocessor 131 performs preprocessing to facilitate the subsequent detecting process. Examples of the preprocessing include information processing into an appropriate form, data parsing, necessary information adding, etc. The characteristic detector 132, the flag detector 133, and the Heuristic detector 134 detect the leakage of sensitive information in cooperation with one another. The characteristic detector 132 determines whether corresponding information is sensitive information with reference to the characteristics of sensitive information transmitted from the sensitive information manager 12. The flag detector 133 determines whether the corresponding information contains a flag attached thereto with reference to the flag attached to sensitive information transmitted from the sensitive information manager 12. The Heuristic detector 134 performs Heuristic analysis to determine whether the corresponding information is sensitive information. For example, if information which should be transmitted through an external interface at specific times is transmitted at different times, the information may be determined as sensitive information. The prevention determining unit 135 determines whether to prevent transmission of the information on the basis of the determination results of the characteristic detector 132, the flag detector 133, and the Heuristic detector 134. Prevention is performed by deleting the transmitted information (data) or disabling the external interface through which the information is transmitted. In the case where the flag detector 133 detects sensitive information, the prevention determining unit 135 may automatically prevent leakage of sensitive information, and in the case where the characteristic detector 132 detects sensitive information, the prevention determining unit 135 may inform the user of the characteristics of the corresponding information so that the user can determine whether to prevent leakage of corresponding information.

Keeping pace with diversification and development of portable terminals, the present invention provides reliable portable terminals which prevent problems capable of being caused by leakage of sensitive information stored in portable terminals by users, thereby contributing to the development of portable terminals.

What is claimed is:

1. A device for detecting and preventing leakage of sensitive information from a portable terminal, the device comprising:
    a data storage unit that stores data containing sensitive information;
    an external interface that facilitates data transfer external to the portable terminal;
    a sensitive information manager that detects and prevents leakage of the sensitive information stored in the data storage unit through the external interface, by extracting characteristics from the sensitive information and attaching a flag to the sensitive information; and
    a sensitive information leakage detecting and preventing unit that is disposed between the data storage unit and the external interface to detect and prevent leakage of the sensitive information,
    wherein the sensitive information leakage detecting and preventing unit comprises:
        a characteristic detector that determines information having the characteristics transmitted from the sensitive information manager as the sensitive information;
        a flag detector that determines information containing the flag transmitted from the sensitive information manager as the sensitive information; and
        a Heuristic detector that learns, in advance, a period in which the user uses information and an access pattern, and detects leakage of the sensitive information based on at least one of the period of the access pattern.

2. The device of claim 1,
    wherein the sensitive information manager extracts a plurality of characteristics from a sensitive information item.

3. The device of claim 1,
    wherein the attachment of the flag does not influence the content of the sensitive information.

4. The device of claim 1,
    wherein the Heuristic detector detects leakage of the sensitive information using Heuristic analysis.

5. The device of claim 1,
    wherein the Heuristic detector determines use of the information that does not correspond to at least of the period or the access pattern as abnormal use, and detects the information from leaking.

6. A method of detecting and preventing leakage of sensitive information from a portable terminal, the method comprising:
    determining, by a sensitive information manager, whether new sensitive information exists;
    when it is determined that new sensitive information exists, extracting, by the sensitive information manager, characteristics from the sensitive information and attaching a flag to the sensitive information;
    transmitting, by the sensitive information manager, the extracted characteristics and the attached flag to a sensitive information leakage detecting and preventing unit;
    monitoring, by the sensitive information leakage detecting and preventing unit, data transmitted from a data storage unit to an external interface to detect and prevent transmission of sensitive information external to the portable terminal;
    determining, the sensitive information leakage detecting and preventing unit, information having the characteristics transmitted from the sensitive information manager or containing the flag transmitted from the sensitive information manager as the sensitive information; and
    learning, by the sensitive information leakage detecting and preventing unit, in advance, a period in which the user uses information and an access pattern, and detecting leakage of the sensitive information based on at least one of the period and the access pattern.

7. The device of claim 1, wherein the external interface comprises at least one of a mobile storage medium interface and a network interface.

8. The device of claim 1, wherein the characteristics comprise:
   a predetermined word contained in a file name;
   private data contained in content of a file,
      wherein the private data includes at least of one a name of a user, a social security number, and an address; and
   a predetermined file extension.

9. The device of claim 1, wherein the external interface is disabled to prevent leakage of the sensitive information.

10. A device for detecting and preventing leakage of sensitive information from a portable terminal, the device comprising:
   a data storage unit that stores data containing sensitive information;
   an external interface including at least one of a mobile storage medium and a network interface, the external interface facilitating data transfer external to the portable terminal;
   a sensitive information manager that detects and prevents leakage of the sensitive information stored in the data storage unit from the portable terminal through the external interface, and the sensitive information manager extracts characteristics from the sensitive information and attaches a flag to the sensitive information; and
   a sensitive information leakage detecting and preventing unit disposed between the data storage unit and the external interface, which detects data having the sensitive information and prevents transmission of the sensitive information by disabling the external interface upon detection of the sensitive information.

* * * * *